Sept. 23, 1952   J. ROMAN   2,611,328

PIE CRIMPING AND SEALING DEVICE

Filed June 7, 1950

INVENTOR
JOHN ROMAN
BY
ATTORNEYS

Patented Sept. 23, 1952

2,611,328

UNITED STATES PATENT OFFICE 2,611,328

PIE CRIMPING AND SEALING DEVICE

John Roman, Elizabeth, N. J., assignor of one-half to Charles Levy, Brooklyn, N. Y.

Application June 7, 1950, Serial No. 166,609

7 Claims. (Cl. 107—49)

This invention relates to a new and improved pastry device for crimping and sealing pies and the like.

Its principal object is to provide an easily manipulable device which will quickly and effectively crimp and seal a pie, a uniform ornamental effect being at the same time imparted to the pie thereby.

Another object of the invention is to provide a scissor-like pie crimping and sealing device which is economical to fabricate and which is composed of only two pivotally connected members.

Other objects of the invention will be apparent from the following description and drawing, which illustrates to scale a preferred embodiment of the invention.

Figure 1:
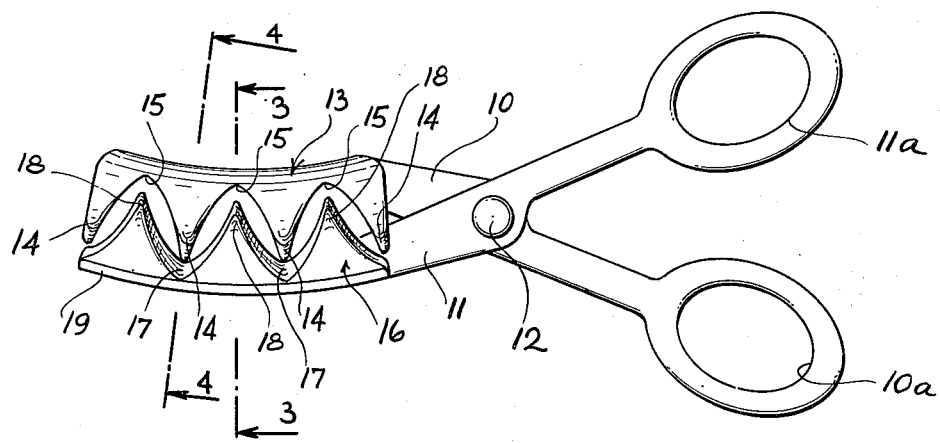
Fig. 1 is a bottom plan view of the device.

Referring to the drawing in detail, the improved device comprises the two operating arms or levers 10 and 11, which are pivotally connected at 12, each said arm being provided at the handle end thereof with the usual finger and thumb loops 10a and 11a respectively.

Provided at the forward operating end of arm 10 and integral therewith is the curved crimping member 13. For convenience, this member will be designated as the inner crimping member. The said inner crimping member is formed with a plurality of alternate curved recesses 14 and projections 15.

Similarly, the forward operating end of arm 11 is also provided with a curved crimping member 16, having alternate curved recesses 17 and projections 18. For convenience, crimping member 16 will be designated as the outer crimping member. Crimping members 13 and 16 are disposed in alined relation, with the recesses and projections of each facing the corresponding projections and recesses of the other. By so arranging the said crimping members, the projections of one are adapted to enter the recesses of the other, as will be more fully explained hereinafter.

Figure 5:
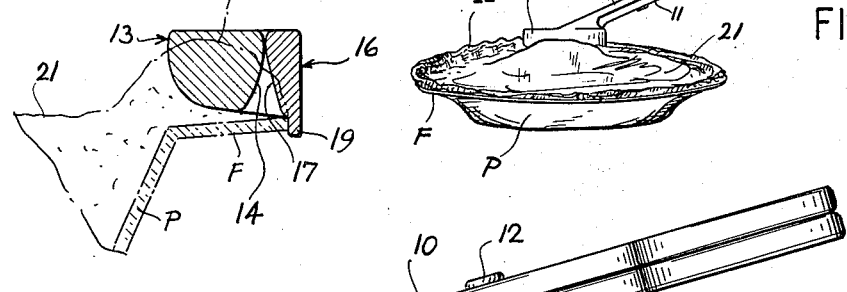
Fig. 5 is a perspective view illustrating the device in use.
Figure 2:
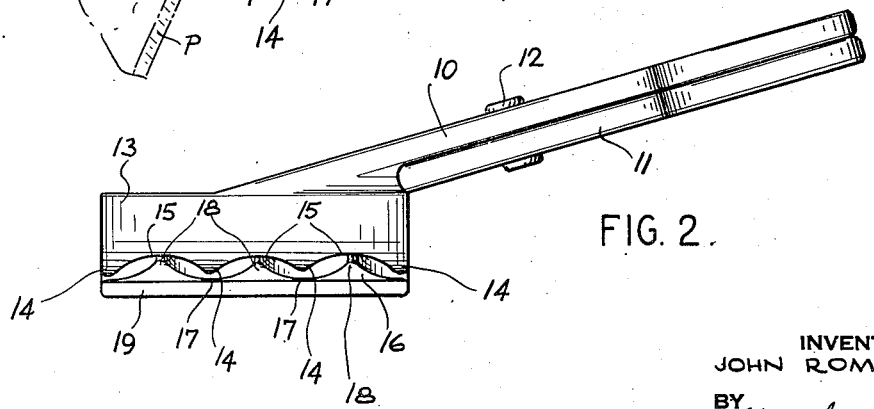
Fig. 2 is a side elevational view thereof, the device being normally held in the said position.

As shown in Figs. 2 and 5, the longitudinal axes of operating arms 10 and 11 are angularly inclined with respect to the longitudinal axes of crimping members 13 and 16. As is evidenced from the drawings, members 13 and 16, which form the crimping structure, i. e., the mating, indented and undulated surfaces, are built about a pair of concentric base lines, which lines, in turn, are concentrically related to the circular contour base line of a pie plate rim, the outer jaw including guiding flange 19 having a concentric relation to the pair of base lines. This permits facile operation of the device, without interferring with or breaking the pie crust to be crimped.

Figure 3:
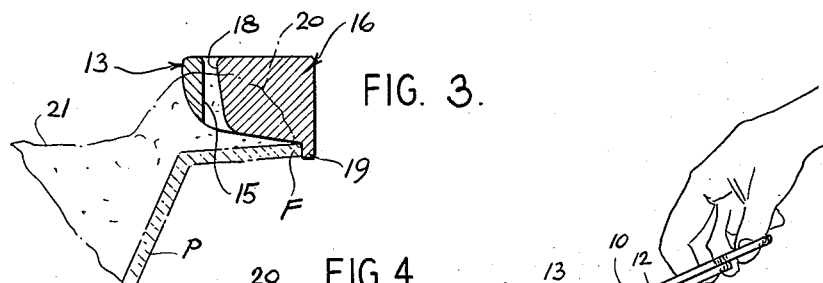
Fig. 3 is a sectional view on the line 3—3 of Fig. 1.
Figure 4:
Fig. 4 is a sectional view on the line 4—4 of Fig. 1.

As clearly shown in Figs. 3 and 4, outer crimping member 16 is provided with a curved flange 19 depending from its lower edge, the said flange being adapted to ride against the peripheral flange F of the pie-plate P. The bottom transverse edge of said crimping member 16 curves upwardly from said flange 19, and the bottom transverse edge of inner crimping member 13 likewise curves upwardly. In effect, the bottom transverse edges of crimping members 13 and 16 are of continuous curved contour when the said crimping or jaw members are moved to closed position with the crimping faces interlocked or intermeshed. The purpose of the said curved construction will hereinafter be explained.

It will be noted from Fig. 4 that the points of the projections 14 of inner crimping member 13 make line contact with the apices of the recesses 17 of outer crimping member 16, whereas in Fig. 3 the points of the projections 18 of said outer crimping member 16 are spaced from and do not contact the apices of the recesses 15 of said inner crimping member. This is so provided in order to prevent the cutting of the pie crust while crimping. It will also be noted that the walls of recesses 15 and 17 of crimping members 13 and 16 are of curved contour. When the device is in the position of Fig. 1, projections 14 of inner crimping member 13 will be located within the corresponding recesses 17 of outer crimping member 16 (in contact as heretofore described), and projections 18 of said inner crimping member will be located within recesses 15 of said outer crimping member. The two end projections of inner crimping member 13 overlie and close the ends of outer crimping member 16, when said crimping members are in the interlocked position of Fig. 1.

Structurally, the device is of the tong or shears type, having a pair of pivoted jaws, with the jaws presenting the configurations of the opposing crimping faces and being located on the opposite side of the pivot from the position of the handles, so that the structure has the simplicity of the tong type of tools.

In operation, however, the structure presents certain peculiarities individual to itself. For instance, due to the fact that the unbaked pie is mounted on a pie-plate, the jaw members do not have their movements in directions to intersect the plane of the work, as is the usual practice in tong use. Instead, these movements are in substantial parallelism with the plane of the plate instead of intersecting or being perpendicular to such plane. Hence, the crimp formations are produced somewhat differently from the usual practice. In practice, after the pie has been fashioned and positioned on the plate with a rough marginal contour indicated in dotted lines in Figs. 3 and 4, the jaws are opened and the outer jaw 16 brought into position so that its guide zone 19 contacts the peripheral edge of the pie plate. This could be provided by moving the member 16 bodily downward in the direction of length of the pivot axis, but a preferred action is that of moving the jaw laterally, with its crimping face facing the marginal zone of the pie, until the guide face is in contact. Either movement will cause the crimping configuration of the outer jaw to shape the peripheral face of the dough formation to conform to the configuration of that jaw face.

As will be understood, due to the prior opening of the jaws, in such position the inner jaw will then overlie the top pie crust, practically inside the marginal zone. When, therefore, the inner jaw is being moved toward its closed position, its crimping face configuration engages the inner portion of the marginal zone and, as the jaw advances, serves to shape the inner portion of the marginal zone. When the two jaws are in their closed relation, the marginal zone will have been reshaped into a replica of the contour configuration of the space conditions set up by the opposite crimping faces.

In producing this result, the conditions exemplified by the showing of Figs. 3 and 4 are of importance. To develop uniformity in appearance of the ornamental design, the closed position of the jaws should be similar with each operation. This is obtained by the conditions shown in Fig. 4, in which the tip of the projection 14 of the inner jaw member 13 reaches actual contact with the face 17 in the apical zone of the recess of the outer jaw member 16. In consequence, at this particular point at the outer perimeter of the pie, the ornamental design is of less depth, as indicated in said view. It tends to form a sharpened edge, as indicated. However, the contact zone is limited in extent in each depression, so that, in appearance of the design, this would appear as a spaced depressed zone. This is due to the conditions presented in the section shown in Fig. 3, which illustrates the conditions in connection with the apical zone of the recesses of the inner member, and in which the opposing faces are separated to a material extent for the complete depth of the faces.

The advantage of the Fig. 3 conditions flows from the fact that during closing of the jaws, the inner face is bringing dough material into the space to be filled and is tending to fill all voids in the space, but, due to the open top, leaving it possible for excess dough to pass out of the space.

The formations at the bottom of the outer jaw member can serve to provide a scalloped appearance to the periphery of the pie, since the closing of the inner member is moving material into position to fill any space left when positioning the outer member. On the contrary, the scalloped lower edge of the inner jaw member, moving over the surface of the top crust will cause the latter, especially in the marginal zone, to be given a ridged appearance toward the ornamental design being produced by the jaw configurations thus enhancing the ornamental appearance of the top of the pie.

As is apparent, the arrangement of the handles at an acute angle to the direction of length of the guide zone 19, and extending outwardly and upwardly from the top of the jaws, is of advantage, since it permits the user to manipulate the assembly under conditions of a minimum of obstruction to the view, a condition especially important since the dimensions of the device are limited in length so that it is necessary to provide a number of successive operations in completing the sealing and crimping of the pie periphery.

Figs. 3, 4 and 5 illustrate the device being used to seal and crimp a pie. A pie crust normally consists of a body shell 20 and a top portion 21. The peripheral edges of said portions must be joined together to seal the pie contents or filling. Normally, such sealing is done by hand by crimping the said edges to produce the raised portion 22. Such crimping is perforce a slow operation, and in most cases a non-ornamental irregular effect is imparted to the said raised portion 22. Frequently, the sealing is imperfect, thereby causing the pie contents or filling to run therefrom.

With the improved device, the sealing and crimping is a relatively simple and quick operation. As shown in Fig. 5, the peripheral edges of shell 20 and top crust 21 are caught intermediate crimping or jaw members 13 and 16 and compressed therein by bringing finger loops 10a and 11a towards each other.

The device is guided around the peripheral edge of the annular flange F of pie-plate P by flange 19 of outer crimping member 16 bearing thereagainst. This is clearly shown in Figs. 3 and 4. These two figures illustrate how the tearing of the pie crust is avoided by curving or rounding the undersides of crimping members 13 and 16.

There has been shown and described a preferred embodiment of the invention. The crimping members 13 and 16 need not be integral with arms 10 and 11 as described, but may be made separately and then assembled if desired.

It is preferred, however, that the device be made of only two pivotally connected members, the elements of each being integral. The device can be made of wood, plastic, metal, or any other desired suitable material.

I claim:

1. A device for sealing and crimping pies and the like comprising a pair of pivoted jaws projecting arcuately from and relative to a substantially vertical pivot axis, said jaws being built about a pair of concentric base lines, which lines in turn are concentrically related to the circular contour base line of a pie plate rim, the outer jaw including a guiding flange concentrically related to the pair of concentric base lines, said jaws respectively presenting outer and inner contour faces for producing the crimped zone of the pie, the jaw carrying the outer contour formation additionally carrying guide means below its contour face formation with the guide arcuate in the projected direction to conform to and cooperate with the pie plate edge in positioning the crimp, said contour faces being positioned in advance of the pivot and being rendered co-operative in producing the crimped zone by movement of the inner jaw pivotally relative to the positioned outer jaw and toward the closed position of the jaws to thereby produce the crimped formation by moving marginal zones of the upper and lower pie crusts into crimping and sealing positions by such jaw-positioning movements.

2. A device as in claim 1 characterized in that the opposing contour faces of the respective jaw members each include recessed and projected face portions arranged successively in the direction of arcuate length of the closed jaw members and in alternation, the facial configurations of the respective opposing faces of the jaw members being complementally formed to present the jaw members in their closed positions as providing a space therebetween having its walls conforming to the inner, outer and top configurations of a marginal zone of the crimped and sealed pie, and symmetrical to the respective concentric base lines.

3. A device as in claim 2 characterized in that the successive depressions of a jaw member contour face are substantially of parabola type outline to thereby produce therebetween the projected portions of the face, the depressions of one jaw member being symmetrically disposed relative to the projected portions of the other jaw member.

4. A device as in claim 1 characterized in that the outer jaw member contour face is symmetrically related to the concentric lines of the member and includes a zone adjacent to and paralleling the guide means with the face of the zone formed of a succession of similar arcuate configurations to thereby aid in sealing the pie and to provide a sinuous and ornamental edge contour to the sealed pie.

5. A device as in claim 1 characterized in that the lower marginal zone of the inner jaw is symmetrically related to the concentric lines of the jaw and is formed with an edge configuration comprising a succession of similar arcuate configurations to thereby present such edge as a succession of depressions interspersed by projected portions, said edge during the closing movement of the jaw members being active to provide an ornamental appearance to the upper crust in the vicinity of the crimped marginal zone.

6. A device as in claim 1 characterized in that the opposing jaws are symmetrical to the respective concentric base lines and are dimensioned and have their active cooperating faces relatively shaped and configured as to cause the jaws when in closed position to present a cross-section through the jaws and through the apical zone of the outer jaw member recess as having an upper restricted zone of the faces in contact within such recesses while a similar cross-section taken through the apical zone of the recesses of the inner jaw member presents the opposing faces as spaced apart from top to bottom, whereby the marginal zone of the pie will be sealed and formed with an ornamental crimped progression varied as to the width of its upper face.

7. A device as in claim 1 characterized in that the jaw members are symmetrical to the respective concentric base lines and are formed symmetrical to the plane of the guide means, with each member having a handle element projected outwardly and upwardly from the top of the jaw member at an acute angle to such guide means plane, the respective handle elements being connected pivotally to each other remote from the positions of the jaws with the pivotal axis normal to the direction of element projection to thereby form the device as of tong or shears type with the handle so positioned as to avoid material visual obstruction to the view of the device user.

JOHN ROMAN.

REFERENCES CITED

The following references are of record in the file of this patent:

UNITED STATES PATENTS

| Number | Name | Date |
|---|---|---|
| 273,382 | Packham | Mar. 6, 1883 |
| 354,657 | Rowe | Dec. 21, 1886 |
| 515,799 | Smith | Mar. 6, 1894 |
| 953,070 | Thompson | Mar. 29, 1910 |
| 1,118,871 | Leonard | Nov. 24, 1914 |
| 1,581,692 | Royall | Apr. 20, 1926 |
| 2,063,754 | Price | Dec. 8, 1936 |
| 2,086,464 | Brown | July 6, 1937 |
| 2,444,857 | Smith | July 6, 1948 |